(No Model.) 2 Sheets—Sheet 1.

G. DE LAVAL.
AUTOMATIC EXHAUST RELIEF VALVE.

No. 521,030. Patented June 5, 1894.

Witnesses:
J. Staib
Chas. H. Smith

Inventor
George de Laval
per Lemuel W. Serrell
Atty (No Model.) 2 Sheets—Sheet 2.

G. DE LAVAL.
AUTOMATIC EXHAUST RELIEF VALVE.

No. 521,030. Patented June 5, 1894.

Witnesses:
J. Staib
Chas H Smith

Inventor:
George de Laval
per Lemuel W. Serrell
Atty

THE NATIONAL LITHOGRAPHING COMPANY,
WASHINGTON, D. C.

UNITED STATES PATENT OFFICE.

GEORGE DE LAVAL, OF WARREN, MASSACHUSETTS, ASSIGNOR TO THE GEO. F. BLAKE MANUFACTURING COMPANY, OF NEW YORK, N. Y.

AUTOMATIC EXHAUST RELIEF-VALVE.

SPECIFICATION forming part of Letters Patent No. 521,030, dated June 5, 1894.

Application filed January 15, 1894. Serial No. 496,872. (No model.)

*To all whom it may concern:*

Be it known that I, GEORGE DE LAVAL, a citizen of the United States, residing at Warren, in the county of Worcester and State of Massachusetts, have invented an Improvement in Automatic Exhaust Relief-Valves, of which the following is a specification.

In Letters Patent No. 270,573, granted January 16, 1883, an automatic exhaust relief valve is represented as applied upon a horizontal steam pipe beyond the pipe leading the exhaust from the engine to the condenser, so that such relief valve may be lifted by the pressure in case the condenser fails to act efficiently.

The present invention is especially intended for vertical exhaust pipes and it is adapted to acting automatically or to being opened by hand and so retained in cases where the condenser is undergoing repairs or is thrown out of action, and I arrange the dash-pot outside of the steam pipe so that there will not be an accumulation of water therein, and the risk of freezing is prevented, and I preferably make the valve itself of rubber of two qualities, one portion being stiff and hard, and the other portion being comparatively soft, so as to seat itself tightly upon the valve seat, and the valve is much lighter than the metal valves heretofore employed.

Figure 2:
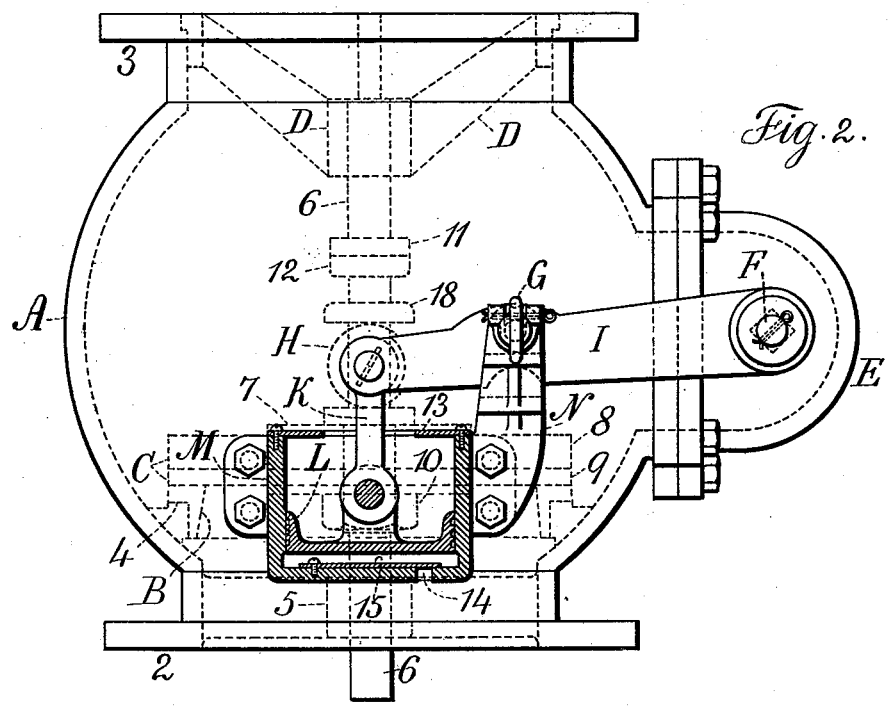
Figure 1:
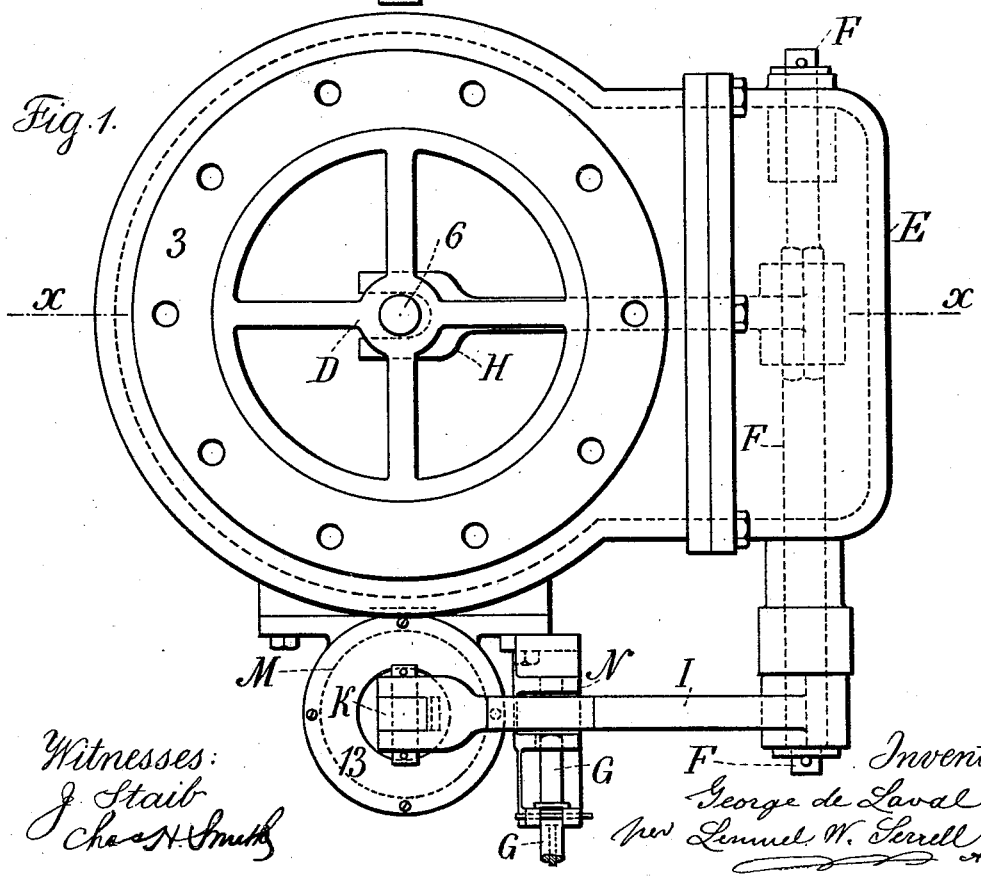
Figure 3:
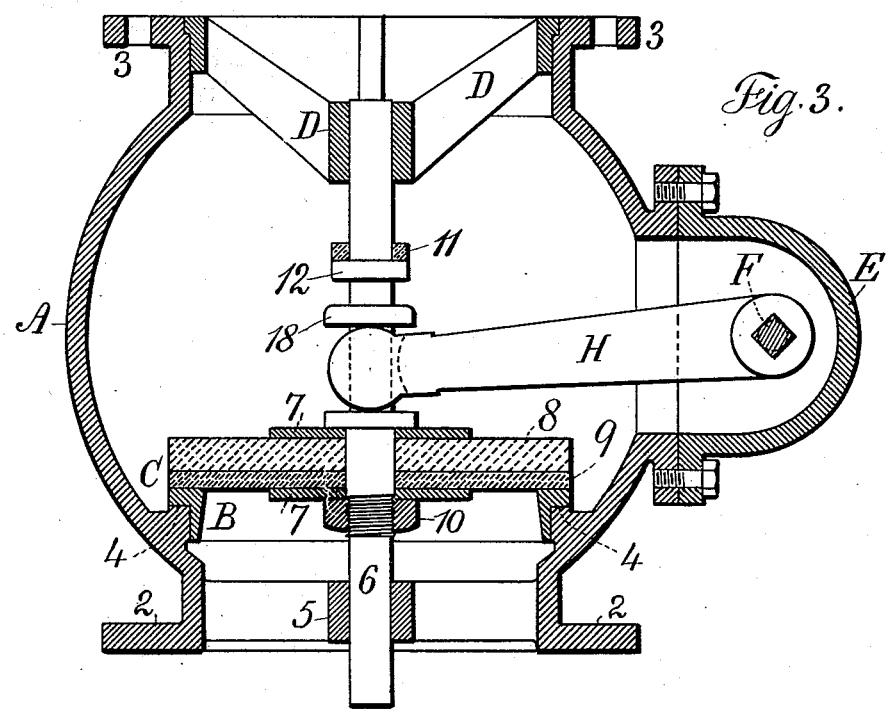
Figure 6:
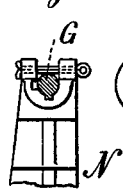
Figure 4:
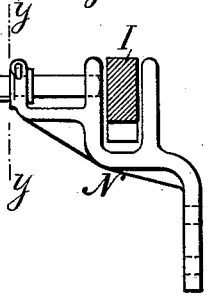
Figure 7:
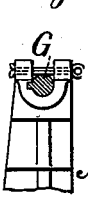
Figure 5:
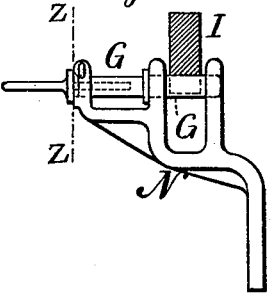

In the drawings, Figure 1 is a plan view. Fig. 2 is an elevation with the dash-pot in section. Fig. 3 is a vertical section at the line *x x*, Fig. 1. Fig. 4 is a detached view of the suspending pin and its bracket with the lever arm in its downward position. Fig. 5 is a similar view with the lever arm in its raised position. Fig. 6 is a cross section at *y y*, Fig. 4, and Fig. 7 is a cross section at *z z*, Fig. 5.

The valve case is preferably globular, as represented at A, and it is open at the under side and provided with a bottom flange 2 for the steam pipe connection and a top flange 3 to which a pipe may be applied leading the exhaust steam in any desired direction to the atmosphere.

The seat B for the relief valve C is preferably a separate casting introduced into the case A and resting upon a shoulder 4, and the valve case is provided with bridges and a central guide 5 for the stem 6 of the valve, and upon the valve stem are collars and washers 7 above and below the valve C, which is preferably made with the upper part 8 of hard rubber and the bottom part 9 of medium soft rubber, in order that the proper stiffness may be obtained in the valve and with the elasticity necessary for a tight joint upon the top of the seat B, and the nut 10 upon the stem 6 is used for clamping the rubber valve securely upon the stem, and there is advantageously a top bridge D to guide the upper end of the valve stem 6; this bridge is inserted within the top flange 3 of the valve case, and there is preferably a rubber washer 11 above the collar 12 to form a stop against the under surface of the top bridge D when the valve is raised.

At one side of the valve case A there is an opening fitted with a removable bonnet E that is bolted in place, and such bonnet carries the rock shaft F that is fitted within the bonnet with a lever H forked at its inner end and passing below the collar 18, and such rock shaft passes out through a suitable gland or bearing and has attached upon its outer end the lever arm I that extends to a link K to the piston L in the dash-pot M, and this dash-pot is bolted at one side of the valve case A and it is open at the top except that a removable sheet metal cover plate 13 is provided for excluding dust and foreign substances, and the dash-pot is closed at the bottom but is perforated with an inlet air-hole 14 over which is a spring 15 that is sufficiently flexible to open by the atmospheric pressure when the piston of the dash-pot is drawn up and to close and confine the air against the descent of the piston, so that this dash-pot regulates the movement of the exhaust relief valve and prevents concussion or hammering when the relief valve is either opened or closed.

It is to be understood that the piston of the dash pot does not fit air tight, and hence it and the valve descend gradually by gravity as usual in dash pots.

The parts thus far described may be used without the addition of the suspending pin hereinafter set forth, and with this device it will be observed that access is given to the valve by removing the bonnet E without disconnecting the pipes that may be bolted to the flanges 2 and 3, and the valve seat and guide can be removed if necessary through the opening at the side of the case, and the lever arm I allows the engineer to open the relief valve from time to time and ascertain that it does not adhere to the seat, and the dash-pot being outside the case is easy of access so as to ascertain that the parts are in order, and such dash-pot is operative either with air or by the insertion of a liquid such as oil or glycerine which will not freeze, and the steam does not come in contact with such dash-pot.

It sometimes becomes advantageous to hold the relief valve open, and with this object in view a bracket N is connected with the case or dash-pot and it is forked and passes at each side of the lever arm I, and there is a suspending pin G provided in this bracket N so that it may be passed across beneath the lever arm when the relief valve is raised so as to sustain the relief valve in its elevated position; and to prevent the suspending pin being easily detached or carelessly pushed in beneath the lever arm, I provide upon the suspending pin G a projection or lug, which, in the normally retracted position of the suspending pin, rests against the outer surface of the bracket N, and there is a notch at one side of the hole through which the suspending pin passes, so that the suspending pin has to be partially rotated to bring the lug or projection to the notch before the suspending pin can be passed beneath the lever arm I; and I remark that the lever arm I is to be of a sufficient width where it is adjacent to the suspending pin G for preventing the suspending pin being pushed over the lever arm, hence the relief valve is maintained in a position for use and cannot be locked down to its seat by the suspending pin.

It is advantageous to provide an eye at the outer end of the suspending pin so as to give facility for moving such suspending pin by hand.

I claim as my invention—

1. The combination with the valve and seat, of a valve case having an opening at one side above the seat, a removable bonnet covering the opening, a rock shaft supported by the bonnet, an arm extending from the rock shaft to the valve stem, an arm outside the bonnet upon the rock shaft, and a dash-pot and a piston and connection to the outer end of the arm, substantially as set forth.

2. In an automatic relief valve, the combination with a valve and its stem, of a valve case and valve seat, a rock shaft and arm within the valve case and another on the end of the rock shaft, a dash-pot having an inlet opening through its bottom end, a piston within the dash-pot, and a connection to the arm of the rock shaft, substantially as set forth.

3. The combination in an automatic relief valve, of a valve case, a valve movable vertically above the seat, a rock shaft and arm to the valve stem, an arm on the valve stem outside the case, a dash-pot, a piston within the dash-pot connected with the arm, and a movable device adapted to act upon the arm and hold the relief valve above its seat, substantially as set forth.

4. The combination in a relief valve, of a case containing the valve seat and having an opening at one side above the valve seat, a removable bonnet covering the opening, a relief valve and its stem, a rock shaft and arm to the valve stem, an arm outside the bonnet, a dash-pot connected at one side of the valve case and having an inlet opening and valve upon the bottom of the dash-pot, a piston within the dash-pot, an arm upon the rock shaft outside the case, a connection from the same to the dash-pot piston; a bracket, forked for the arm, and a suspending pin passing through the bracket and having a lug to determine the position of the pin and adapted to suspend the relief valve, substantially as set forth.

Signed by me this 10th day of January, 1894.

GEO. DE LAVAL.

Witnesses:
GEORGE P. ABORN,
FRED E. COOK.